3,174,975
IMIDAZOLINE DERIVATIVES
André L. Langis and Ferenc Herr, St. Laurent, Quebec, Canada, assignors to American Home Products Corporation, New York, N.Y., a corporation of Delaware
No Drawing. Filed June 10, 1964, Ser. No. 374,162
6 Claims. (Cl. 260—309.6)

This application is a continuation-in-part of our copending application S.N. 170,792, filed February 2, 1962, which is now abandoned.

This invention relates to 2-imidazoline derivatives of the following general structure—

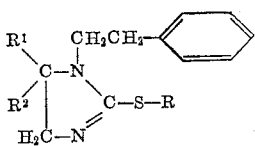

in which R represents the benzyl or a substituted benzyl group, $R^1$ represents hydrogen, lower alkyl, or phenyl, and $R^2$ represents hydrogen or lower alkyl. Among preferred compounds falling within the scope of this invention are those in which R represents the benzyl, 2-chlorobenzyl, 2,4- and 3,4-dichlorobenzyl, or 2-, 3-, or 4-methylbenzyl group; $R^1$ represents a lower alkyl group or the phenyl group; and $R^2$ represents hydrogen or a lower alkyl group. The term "lower alkyl" is intended to designate radicals containing not more than four carbon atoms. This invention is also directed to the acid addition salts of the above compounds with pharmacologically acceptable acids.

These compounds have pharmacologically useful bronchodilator and anticonvulsive properties. They will protect test animals against bronchospasms, caused by acetylcholine and histamine, as well as against shock caused by pentamethylene-tetrazole, and they will raise the threshold values of electroshock convulsions. Their pharmacologically acceptable acid addition salts are equivalent to the compounds themselves and may be administered orally or by injection.

The compounds of this invention may be prepared in the following manner.

β-Phenethylamine is reacted with an aldehyde or a ketone of the formula $R^1R^2CO$ in which $R^1$ represents a lower alkyl or the phenyl group and $R^2$ represents hydrogen or a lower alkyl group, in the presence of an alkali bisulfite and alkali cyanide. The resulting substituted (β-phenethylamino) acetonitrile in which $R^1$ and $R^2$ have the significance defined above is reduced with lithium aluminium hydride to yield the correspondingly substituted (β-phenethylamino) ethylamine in which $R^1$ and $R^2$ have the significance defined above. The latter compound is reacted with carbon disulfide to yield the corresponding 1-(β-phenethyl)-2-imidazolidinethione in which $R^1$ and $R^2$ have the significance defined above, which is in turn reacted with a benzyl halide or a substituted benzyl halide of the formula RX in which R represents the benzyl, 2-chlorobenzyl, 2,4- or 3,4-dichlorobenzyl, or the 2-, 3-, or 4-methylbenzyl groups and X represents chlorine or bromine, to yield the desired 1-(β-phenethyl)-2-benzylmercapto- or substituted benzylmercapto-2-imidazoline in which R, $R^1$ and $R^2$ have the significance defined above. The following formulae will illustrate this method.

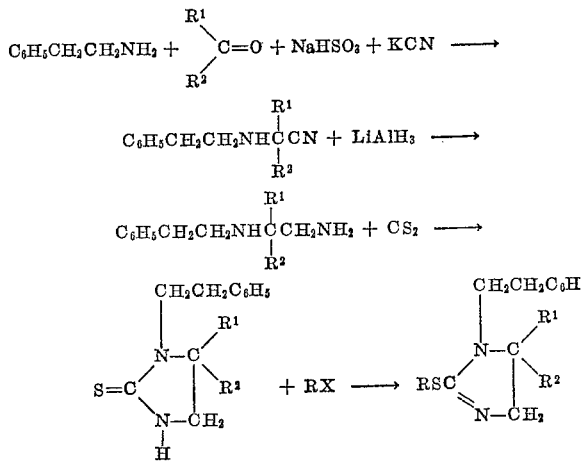

The following examples which should not be considered as limiting the scope of this invention, should be regarded as illustrations thereof.

EXAMPLE 1

2-(β-phenethylamino)propionitrile

Sodium bisulfite (104.06 g., 1 mole) is dissolved in 500 cc. of water. The solution is cooled to 10° C., and 44.05 g. (1 mole) of acetaldehyde are added dropwise maintaining the temperature of the reaction mixture at 15–16° C. 121 g. (1 mole) of β-phenethylamine are then added dropwise to the sodium bisulfite addition product. A solution of 65.15 g. (1 mole) of potassium cyanide in 250 ml. of water is finally added to the reaction mixture which is kept at 15–16° C. throughout the addition. After stirring at room temperature for two hours a thick oil separates on the surface and is extracted with benzene. The solvent is evaporated under reduced pressure and the product is distilled, B.P. 133° C./14 mm.

Using the same conditions, iso-butyraldehyde yields 2-(β - phenethylamino) - 3-methylbutyronitrile, B.P. 145–149° C./30 mm.; butyraldehyde yields 2-(β-phenethylamino)valeronitrile, B.P. 138–148° C./20 mm.; benzaldehyde yields 2-(β-phenethylamino)-2-phenylacetonitrile, M.P. 82–87° C.; acetone yields 2-(β-phenethylamino)-2,2-dimethylacetonitrile, B.P. 126–130° C./19 mm. All the above compounds are also identified by elementary analysis.

EXAMPLE 2

2-(β-phenethylamino)propylamine 100 g. of 2-(β-phenethylamino)propionitrile dissolved in 100 cc. of dry ether are added dropwise to a mixture of 23.0 g. of lithium aluminium hydride in 250 ml. of ether. The mixture is heated to reflux for one hour. 53 ml. of water are then added dropwise to the reactants which had been previously cooled in an ice and water bath. The inorganic salts are filtered off, the ether is evaporated under reduced pressure and the residue distilled, B.P. 138–140° C./8 mm.

Using the same conditions, 2-(β-phenethylamino)-3-methylbutyronitrile yields 2 - (β - phenethylamino)-3-methylbutylamine, B.P. 168–172° C./17 mm.; 2-(β-phenethylamino)valeronitrile yields 2 - (β - phenethylamino)pentylamine, B.P. 177–182° C./20 mm.; 2-(β-phenethylamino)-2-phenylacetonitrile yields 2-(β-phenethylamino)-2-phenylethylamine, B.P. 219–223° C./19 mm.;

2-(β-phenethylamino)-2,2-dimethylacetonitrile yields 2-(β - phenethylamino - 2-methtylpropylamine, B.P. 142–148° C./13 mm. All the above compounds are also identified by elementary analysis.

EXAMPLE 3

1-(β-phenethyl)-5-methyl-2-imidazolidinethione

To 53.4 g. of 2-(β-phenethylamino)propylamine dissolved in 500 ml. of acetone are added 24.1 g. of carbon disulfide, maintaining the temperature of the mixture at 15° C. with the aid of an ice and water bath. The white crystalline mass which is formed is filtered, heated at 145–150° C. for ten minutes, and recrystallized from acetone, M.P. 113–115° C.

Using the same reaction conditions, 2-(β-phenethylamino)-3-methylbutylamine yields 1-(β-phenethyl)-5-isopropyl-2-imidazolidinethione, M.P. 88–89° C.; 2-(β-phenethylamino)pentylamine yields 1-(β-phenethyl)-5-propyl-2-imidazolidinethione, M.P. 78–79° C.; 2-(β-phenethyl)-2 - phenylethylamine yields 1-(β-phenethyl)-5-phenyl-2-imidazolidinethione, M.P. 176–177° C.; 2-(β-phenethylamino)-2-methylpropylamine yields 1-(β-phenethyl)-2,2-dimethyl-2-imidazolidinethione, M.P. 111–112° C. All the above compounds are also identified by elementary analysis.

EXAMPLE 4

1-(β-phenethyl)-2-benzylmercapto-5-methyl-2-imidazoline

1(β-phenethyl)-5-methyl-2-imidazolidinethione (5.5 g.) and 3.2 g. of benzyl chloride are dissolved in 50 ml. of ethanol and the solution is heated to reflux for sixteen hours. The solvent is evaporated under reduced pressure and the residue is crystallized from a methanolether mixture to yield the hydrochloride salt of the title compound (1), M.P. 93–95° C. The corresponding hydrobromide salt is obtained as above by using benzyl bromide instead of benzyl chloride. The free base is obtained from either salt by treating an aqueous solution thereof with an excess of dilute alkali, extracting with benzene, and evaporating the solvent; it is characterized by I.R. bands with $\nu_{max}$ 1555, 1515, 1382, 1365, 990 cm.$^{-1}$.

Under the same reaction conditions, and using the appropriate starting materials described in Example 3, the following compounds are also obtained:

1-(β-phenethyl)-2-(2'-chlorobenzylmercapto)-5-methyl-2-imidazoline (2)
1-(β-phenethyl)-2-(2',4'-dichlorobenzylmercapto)-5-methyl-2-imidazoline (3)
1-(β-phenethyl)-2-(3',4'-dichlorobenzylmercapto)-5-methyl-2-imidazoline (4)
1-(β-phenethyl)-2-(2'-methylbenzylmercapto)-5-methyl-2-imidazoline (5)
1-(β-phenethyl)-2-(3'-methylbenzylmercapto)-5-methyl-2-imidazoline (6)
1-(β-phenethyl)-2-(4'-methylbenzylmercapto)-5-methyl-2-imidazoline (7)
1-(β-phenethyl)-2-benzylmercapto-5-isopropyl-2-imidazoline (8)
1-(β-phenethyl)-2-benzylmercapto-5-propyl-2-imidazoline (9)
1-(β-phenethyl)-2-benzylmercapto-5-phenyl-2-imidazoline (10)
1-(β-phenethyl)-2-benzylmercapto-5,5-dimethyl-2-imidazoline (11)
1-(β-phenethyl)-2-(2'-methylbenzyl)-5,5-dimethyl-2-imidazoline (12)
1-(β-phenethyl)-2-(3'-methylbenzyl)-5,5-dimethyl-2-imidazoline (13)
1-(β-phenethyl)-2-(4'-methylbenzyl)-5,5-dimethyl-2-imidazoline (14)

All the above compounds are also identified by elementary analysis, and their chemical structures and physical constants are further exemplified in Table I. The numbers in parentheses following each of the above chemical names refer to the same numbers in Table I, in which R, R$^1$ and R$^2$ are as defined above. Table I shows the hydrohalide salts of the compounds described above and the free bases prepared from those salts. Those free bases are prepared by reacting the corresponding salts in aqueous solution with an excess of dilute alkali followed by extraction with a water-immiscible organic solvent such as, for example, benzene, ether, or chloroform. The free bases are characterized by their I. R. absorption spectra, and the salts are characterized by their melting points.

TABLE I

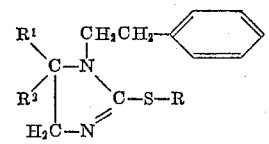

| No. | R | R$^1$ | R$^2$ | Salt | M.P., °C. | Reaction Solvent | Free bases, I. R. cm.$^{-1}$ |
|---|---|---|---|---|---|---|---|
| 1 | C$_6$H$_5$CH$_2$ | CH$_3$ | H | HCl | 93–95 | Ethanol | 1,555, 1,515, 1,382, 1,365, 990 |
| 2 | 2-ClC$_6$H$_4$CH$_2$ | CH$_3$ | H | HCl | 126–127 | do | 1,560, 1,460, 1,450, 1,395, 1,380, 1,365, 1,055 |
| 3 | 2,4-Cl$_2$C$_6$H$_3$CH$_2$ | CH$_3$ | H | HCl | 108–109 | Butanol | |
| 4 | 3,4-Cl$_2$C$_6$H$_3$CH$_2$ | CH$_3$ | H | HCl | 113–114 | do | 1,560, 1,475, 1,458, 1,395, 1,365, 1,035 |
| 5 | 2-CH$_3$C$_6$H$_4$CH$_2$ | CH$_3$ | H | HBr | 150–151 | Benzene | 1,555, 1,380, 1,365, 988 |
| 6 | 3-CH$_3$C$_6$H$_4$CH$_2$ | CH$_3$ | H | HBr | 151–152 | do | 1,555, 1,381, 1,366, 988 |
| 7 | 4-CH$_3$C$_6$H$_4$CH$_2$ | CH$_3$ | H | HBr | 142–143 | do | 1,556, 1,517, 1,380, 1,365, 988, 822 |
| 8 | C$_6$H$_5$CH$_2$ | (CH$_3$)$_2$CH | H | HCl | 131–132 | Butanol | 1,565, 1,396, 1,376, 1,109, 1,075, 1,033 |
| 9 | C$_6$H$_5$CH$_2$ | CH$_3$(CH$_2$)$_2$ | H | HCl | 107–108 | do | 1,565, 1,397, 1,366, 1,085, 1,075, 1,033 |
| 10 | C$_6$H$_5$CH$_2$ | C$_6$H$_5$ | H | HBr | 170–171 | Benzene | 1,568, 1,395, 1,365, 1,075, 1,033 |
| 11 | C$_6$H$_5$CH$_2$ | CH$_3$ | CH$_3$ | HCl | 129–130 | Butanol | |
| 12 | 2-CH$_3$C$_6$H$_4$CH$_2$ | CH$_3$ | CH$_3$ | HBr | 154–156 | Benzene | 1,555, 1,390, 1,370, 1,358, 1,313 |
| 13 | 3-CH$_3$C$_6$H$_4$CH$_2$ | CH$_3$ | CH$_3$ | HBr | 151–152 | do | 1,555, 1,390, 1,370, 1,358, 1,313 |
| 14 | 4-CH$_3$C$_6$H$_4$CH$_2$ | CH$_3$ | CH$_3$ | HBr | 148–149 | do | 1,555, 1,518, 1,370, 1,358, 1,313, 822 |

We claim:
1. A compound selected from the group which consists of derivatives of 2-imidazoline of the following formula—

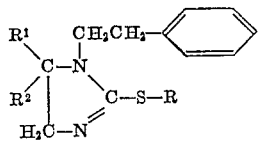

in which R is selected from the group consisting of benzyl, 2-chlorobenzyl, 2,4-dichlorobenzyl, 3,4-dichlorobenzyl, 2-methylbenzyl, 3-methylbenzyl, and 4-methylbenzyl; $R^1$ is selected from the group consisting of lower alkyl and phenyl; and $R^2$ is selected from the group consisting of hydrogen and methyl; and their acid addition salts with pharmacologically acceptable hydrohalic acids.

2. 1 - ($\beta$ - phenethyl) - 2 - benzylmercapto - 5 - methyl-2-imidazoline.

3. 1 - ($\beta$ -phenethyl) - 2 - (2' - chlorobenzylmercapto)-5-methyl-2-imidazoline.

4. 1 - ($\beta$ - phenethyl) - 2 - (3',4' - dichlorobenzylmercapto)-5-methyl-2-imidazoline.

5. 1 - ($\beta$-phenethyl) - 2 - benzylmercapto - 5 - propyl-2-imidazoline.

6. 1 - ($\beta$ - phenethyl) - 2 - benzylmercapto - 5,5 - dimethyl-2-imidazoline.

No references cited.